(12) United States Patent
McIntyre et al.

(10) Patent No.: US 10,690,279 B2
(45) Date of Patent: Jun. 23, 2020

(54) VALVE CONNECTOR

(71) Applicant: MILWAUKEE ELECTRIC TOOL CORPORATION, Brookfield, WI (US)

(72) Inventors: Ross McIntyre, Milwaukee, WI (US); Jonathan M. Mantes, Franklin, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 113 days.

(21) Appl. No.: 15/924,375

(22) Filed: Mar. 19, 2018

(65) Prior Publication Data

US 2018/0274707 A1    Sep. 27, 2018

Related U.S. Application Data

(60) Provisional application No. 62/474,315, filed on Mar. 21, 2017.

(51) Int. Cl.
| | |
|---|---|
| *F16L 37/40* | (2006.01) |
| *F16L 37/138* | (2006.01) |
| *F16K 15/20* | (2006.01) |
| *B60C 29/00* | (2006.01) |
| *B60C 29/06* | (2006.01) |

(52) U.S. Cl.
CPC .............. *F16L 37/40* (2013.01); *B60C 29/00* (2013.01); *B60C 29/06* (2013.01); *F16K 15/20* (2013.01); *F16L 37/138* (2013.01)

(58) Field of Classification Search
CPC ........ F16L 37/40; F16L 37/138; B60C 29/00; B60C 29/06; F16K 15/20
USPC ........................................................... 141/38
See application file for complete search history.

(56) References Cited

U.S. PATENT DOCUMENTS

| | | | |
|---|---|---|---|
| 5,012,954 A | 5/1991 | Will | |
| 9,309,980 B2 | 4/2016 | Ward et al. | |
| 2011/0192492 A1* | 8/2011 | Kanenari | .............. B29C 73/166 |
| | | | 141/38 |

FOREIGN PATENT DOCUMENTS

GB        1599304        9/1981

* cited by examiner

*Primary Examiner* — P. Macade Nichols
(74) *Attorney, Agent, or Firm* — Michael Best & Friedrich LLP

(57) ABSTRACT

A valve connector comprises a body including an inlet port, an outlet port defining a longitudinal axis, at least one aperture extending between an exterior surface of the body and the outlet port. The valve connector also comprises a sleeve arranged about the exterior surface of the body and movable relative to the body between a clamping position and a release position and a biasing member applying a biasing force against the sleeve towards the clamping position. The valve connector further comprises a clamping mechanism including at least one clamping member arranged at least partially within the aperture. When the valve is received in the outlet port, the clamping member is inwardly displaceable into the outlet port in response to the biasing force biasing the sleeve toward the clamping position, such that the clamping member engages the valve.

20 Claims, 2 Drawing Sheets

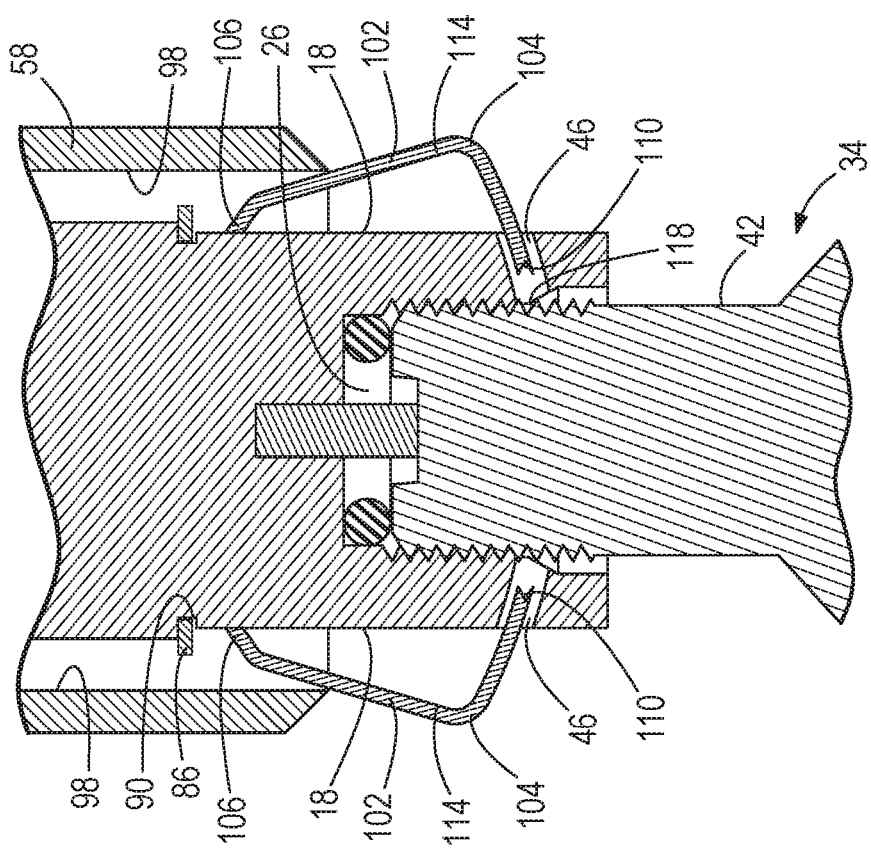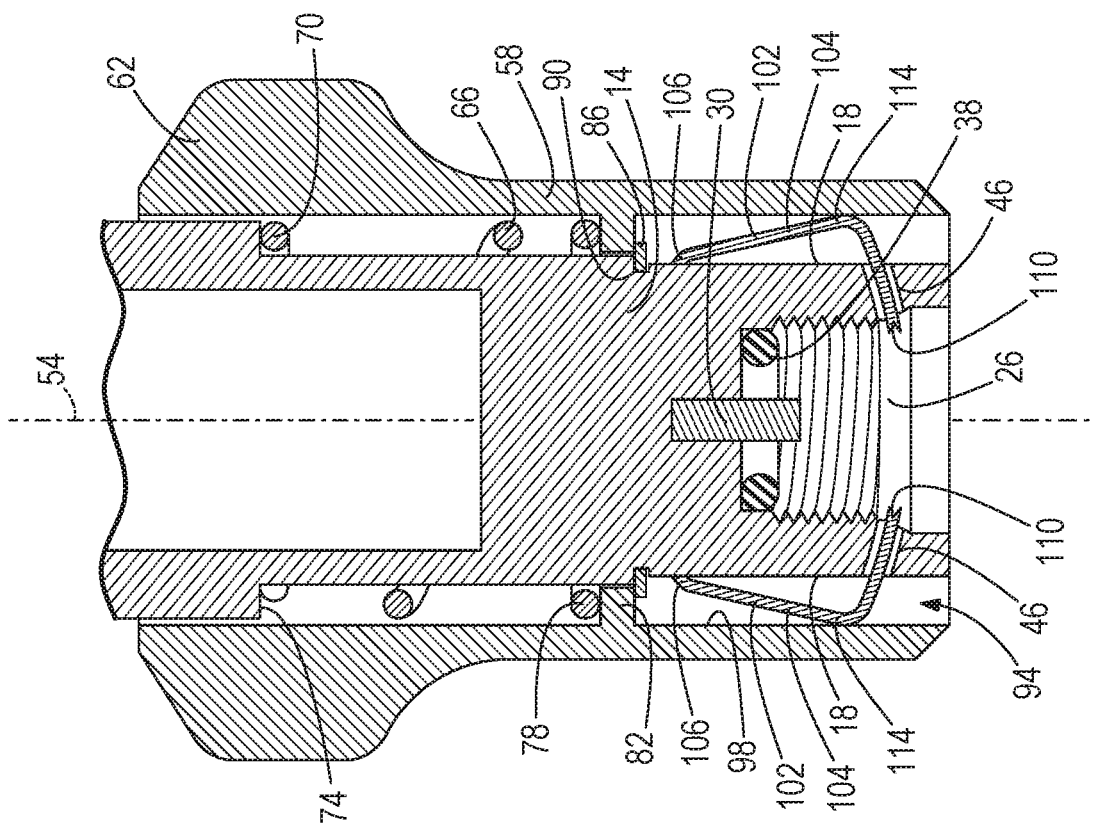

VALVE CONNECTOR

CROSS-REFERENCE TO RELATED APPLICATIONS

This application claims priority to U.S. Provisional Patent Application No. 62/474,315 filed on Mar. 21, 2017, the entire content of which is incorporated herein by reference.

FIELD OF THE INVENTION

The present invention relates to valve connectors, and more particularly to quick-release valve connectors.

BACKGROUND OF THE INVENTION

Valve connectors may be used to temporarily connect a valve in an inflatable object to a source of compressed gas.

SUMMARY OF THE INVENTION

The present invention provides, in one aspect, a valve connector comprising a body including an inlet port through which a compressed gas is receivable, and an outlet port in which a valve is at least partially receivable, the outlet port defining a longitudinal axis. The body also includes at least one aperture extending between an exterior surface of the body and the outlet port and a contact portion that is defined on the exterior surface of the body opposite the outlet port and is intersected by the longitudinal axis. The valve connector further comprises a sleeve arranged about the exterior surface of the body, the sleeve movable relative to the body between a clamping position and a release position. The valve connector also comprises a biasing member applying a biasing force against the sleeve towards the clamping position and a clamping mechanism. The clamping mechanism includes at least one clamping member arranged at least partially within the aperture. When the valve is received in the outlet port, the clamping member is inwardly displaceable into the outlet port in response to the biasing force biasing the sleeve toward the clamping position, such that the clamping member engages the valve. In response to a first force applied against the contact portion in the direction of the outlet port and a second force applied against the sleeve in a direction opposite the biasing force to overcome the biasing force and move the sleeve toward the release position, the clamping member is separable from the valve.

The present invention provides, in another aspect, a valve connector comprising a body including an inlet port through which a compressed gas is receivable, an outlet port defining a longitudinal axis, at least one aperture extending between an exterior surface of the body and the outlet port, and a contact portion that is defined on the exterior surface of the body opposite the outlet port. The valve connector further comprises a sleeve arranged about the exterior surface of the body, the sleeve movable relative to the body between a clamping position and a release position. The valve connector also comprises a biasing member applying a biasing force against the sleeve towards the clamping position and a clamping mechanism. The clamping mechanism includes at least one clamping member arranged at least partially within the aperture. In response to the biasing force biasing the sleeve toward the clamping position, the clamping member is moved into the outlet port. In response to a first force applied against the contact portion and a second force applied against the sleeve in a direction opposite the biasing force, the sleeve is moved towards the release position and the clamping member moves out of the outlet port.

The present invention provides, in yet another aspect, a valve connector comprising a body including an inlet port through which a compressed gas is receivable, an outlet port defining a longitudinal axis, a plurality of apertures extending between an exterior surface of the body and the outlet port, and a contact portion that is defined on the exterior surface of the body opposite the outlet port and is intersected by the longitudinal axis. The valve connector also comprises a sleeve arranged about the exterior surface of the body, the sleeve movable relative to the body between a clamping position and a release position. The valve connector further comprises a compression spring applying a biasing force against the sleeve towards the clamping position and a clamping mechanism. The clamping mechanism comprises a plurality of leaf springs corresponding to the plurality of apertures, each leaf spring including a first end attached to the exterior surface, an opposite second end arranged at least partially within the corresponding aperture, and an intermediate portion between the first and second ends, each of the leaf springs having an internal bias causing the second end to deflect away from the longitudinal axis. In response to the biasing force biasing the sleeve toward the clamping position, the sleeve contacts the intermediate portions of the leaf springs, and the second ends of the leaf springs are moved into the outlet port. In response to a first force applied against the contact portion in the direction of the outlet port and a second force applied against the sleeve in a direction opposite the biasing force, the sleeve is moved towards the release position and the second ends of the leaf springs move out of the outlet port.

Other features and aspects of the invention will become apparent by consideration of the following detailed description and accompanying drawings.

BRIEF DESCRIPTION OF THE DRAWINGS

FIG. 3 is an enlarged cross-sectional view of the valve connector of FIG. 1, illustrating a sleeve in a clamping position.

FIG. 4 is an enlarged cross-sectional view of the valve connector of FIG. 1, illustrating the sleeve in a release position.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
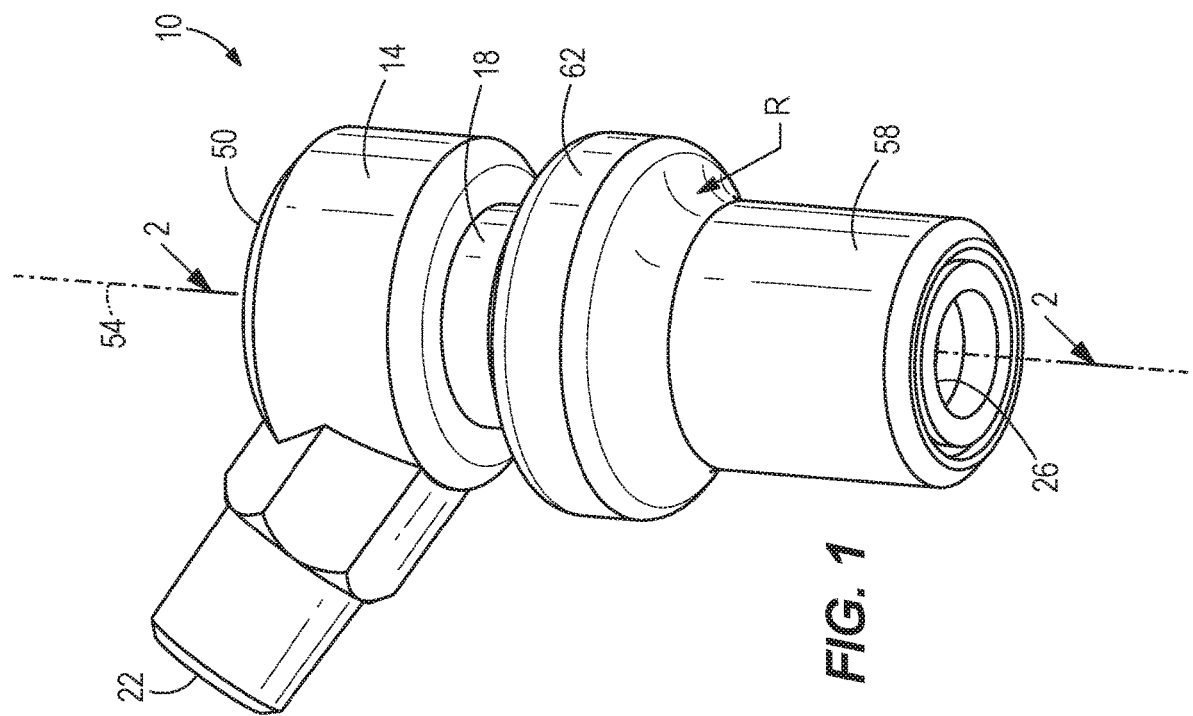
FIG. 1 is a perspective view of a valve connector in accordance with an embodiment of the invention.
Figure 2:
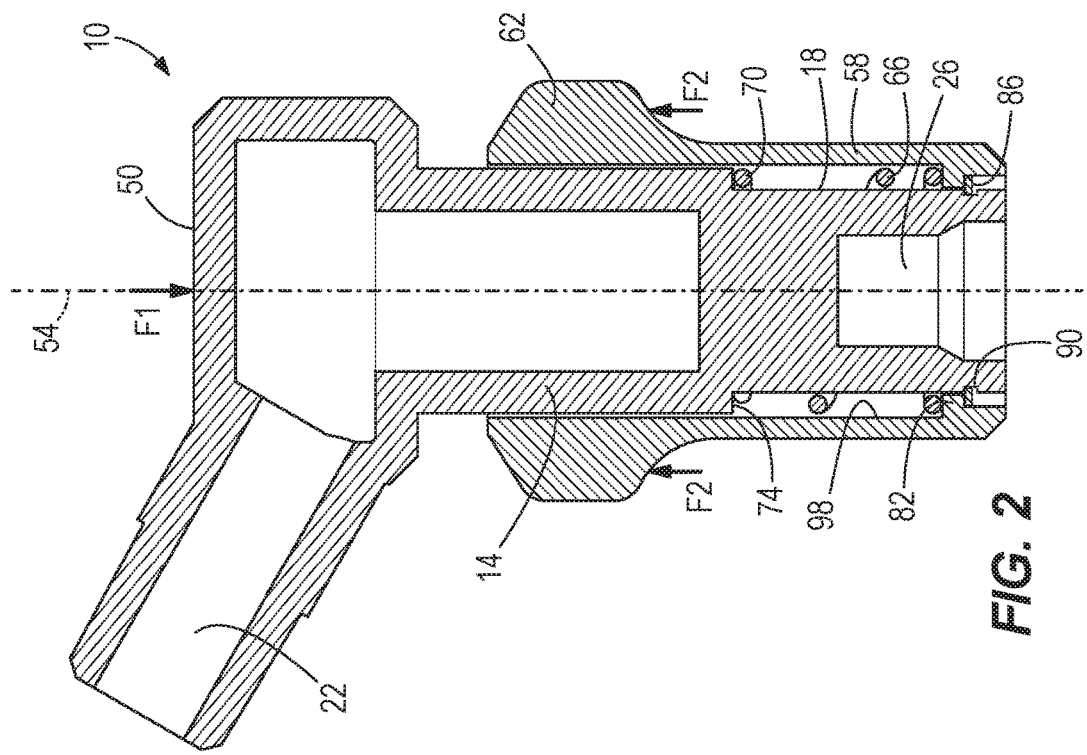
FIG. 2 is a cross-sectional view of a portion of the valve connector of FIG. 1.

FIG. 1 illustrates a valve connector 10 usable with a portable or stationary air compressor (not shown) to temporarily connect an inflatable object with compressed air (or another gas) from the air compressor. The valve connector 10 includes a body 14 having an exterior surface 18, an inlet port 22 through which the compressed air may enter the valve connector 10, and an outlet port 26 through which the compressed air may be discharged from the valve connector 10 (FIG. 2). The valve connector 10 also includes a pin 30 (FIG. 3) protruding into the outlet port 26 that is engageable with a needle of a Schrader valve 34 (FIG. 4) when the valve 34 is received within the outlet port 26. The valve connector 10 further includes a seal 38 (e.g., an O-ring) in the outlet port 26 that is engageable with an outer housing 42 of the Schrader valve 34 to seal the outlet port 26 to the Schrader valve 34.

With reference to FIG. 3, the body 14 includes one or more radially extending apertures 46 extending between the exterior surface 18 and the outlet port 26 and a contact portion 50 (FIG. 2) defined on the exterior surface 18 of the body 14 opposite the outlet port 26. As shown in FIGS. 2 and 3, the contact portion 50 is intersected by a longitudinal axis 54 defined by the outlet port 26, with the inlet port 22 being adjacent the contact portion 50 and not intersected by the longitudinal axis 54.

With reference to FIGS. 1-3, the valve connector 10 also includes a sleeve 58 that is arranged about the exterior surface 18 of the body 14 and is slidable relative to the body 14 along the longitudinal axis 54. The sleeve 58 includes a radially outward-extending shoulder 62 at one end defining the largest width dimension of the sleeve 58. The shoulder 62 is defined by a radius R (FIG. 1) of sufficient size to facilitate a user grasping the shoulder 62 between two fingers while the valve connector 10 is being attached to or removed from the valve 34 as described in greater detail below. Alternatively, the shoulder 62 may extend radially outward at an approximately right angle.

As shown in FIGS. 2 and 3, a biasing member, such as a compression spring 66, is arranged between the sleeve 58 and the exterior surface 18 of the body 14. A first end 70 of the spring 66 is seated against a circumferential shoulder 74 on the exterior surface 18 of the body 14, whereas a second end 78 of the spring 66 is seated against a radially inward-extending circumferential flange 82 on the interior of the sleeve 58. A retaining ring 86 (e.g., a C-clip) is attached to the body 14 and partly received in a radially inward-extending circumferential groove 90 in the exterior surface 18. The spring 66 applies a biasing force against the sleeve 58 in a direction of the outlet port 26, with displacement of the sleeve 58 in the direction of the outlet port 26 being limited by contact between the flange 82 and the retaining ring 86.

As shown in FIGS. 3 and 4, the valve connector further includes a clamping mechanism 94 provided between the sleeve 58 and the outlet port 26. The clamping mechanism 94 includes an actuating surface 98, such as an inner wall of the sleeve 58, and one or more clamping members 102 respectively arranged in the one or more apertures 46. The actuating surface 98 may be generally cylindrical or include a reverse taper relative to the longitudinal axis 54 (i.e., with a smallest diameter being located proximate the flange 82). In the illustrated embodiment of FIGS. 3 and 4, the clamping members 102 are configured as leaf springs 104 each having a first end 106 rigidly attached to the exterior surface 18 of the body 14 and a second, free end 110 capable of protruding into the outlet port 26. Each of the leaf springs 104 has an internal bias causing the free end 110 to deflect radially outward and away from the longitudinal axis 54. Also, as shown in the illustrated embodiment of FIGS. 3 and 4, the two leaf springs 104 are arranged opposite each other. In other embodiments, the at least one clamping member 102 could be at least one discrete ball detent member or a retaining clip. In the biased (clamping) position of the sleeve 58 shown in FIG. 3, the actuating surface 98 of the sleeve 58 engages intermediate portions 114 of the respective leaf springs 104, displacing the free ends 110 of the respective leaf springs 104 radially inward into the outlet port 26.

When a user desires to attach the valve connector 10 to the Schrader valve 34 in preparation for an inflation operation, the user applies a first force F1 (FIG. 2) to the contact portion 50 along the longitudinal axis 54 and in a direction of the outlet port 26 (e.g., by pushing the contact portion 50 with a thumb) and a second force F2 against the sleeve 58 in a direction opposite the first force F1 and the biasing force of the spring 66 (e.g., by grasping the shoulder 62 with an index and middle finger). The applied forces F1, F2 must each exceed the biasing force of the spring 66 to slide the sleeve 58 away from its biased clamping position toward a release position, as shown in FIG. 4. In the release position, the intermediate portions 114 of the leaf springs 104 are either uncovered by the actuating surface 98 of the sleeve 58 (as shown in FIG. 4) or in facing relationship with a large-diameter region of the actuating surface 98, which in turn permits the leaf springs 104 to naturally deflect outward and remove the free ends 110 from the outlet port 26.

The user then inserts the Schrader valve 34 into the outlet port 26, as shown in FIG. 4. The Schrader valve 34 has an exterior threaded surface 118 and a valve needle (not shown) for opening the valve 34. When the Schrader valve 34 is inserted into the outlet port 26, the pin 30 contacts the valve needle to open the valve 34. Although the illustrated valve is a Schrader valve 34, alternatively the valve connector may be configured for use with any type of pneumatic valve capable of receiving a compressed gas, including but not limited to a Presta Valve and a Dunlop valve.

Once the valve 34 has been inserted into the outlet port 26, the user removes at least the applied force F2 by releasing the sleeve 58. The sleeve 58 is then biased back to the clamping position by the spring 66 as shown in FIG. 3, which causes the actuating surface 98 to inwardly displace the leaf springs 104 into the outlet port 26 to engage the threaded surface 118 of the valve 34 (not shown in FIG. 3), thereby securing the valve 34 within the outlet port 26. To detach the valve connector 10 from the Schrader valve 34, the user again applies the forces F1, F2 to the contact portion 50 of the body and the sleeve 58, respectively, sliding the sleeve 58 back to the release position in the manner described above, allowing the leaf springs 104 to deflect outwardly and away from the longitudinal axis 54. After the free ends 110 of the respective leaf springs 104 have been separated from the Schrader valve 34, the valve connector 10 may be removed from the valve 34.

Various features of the invention are set forth in the following claims.

What is claimed is:
1. A valve connector comprising:
   a body including
      an outlet port in which a valve is at least partially receivable to receive compressed gas discharged from the outlet port, the outlet port defining a longitudinal axis,
      at least one aperture extending between an exterior surface of the body and the outlet port, and
      a contact portion that is defined on the exterior surface of the body opposite the outlet port and is intersected by the longitudinal axis;
   a sleeve arranged about the exterior surface of the body, the sleeve movable relative to the body between a clamping position and a release position;

a biasing member applying a biasing force against the sleeve towards the clamping position; and a clamping mechanism including at least one clamping member arranged at least partially within the aperture, wherein when the valve is received in the outlet port, the clamping member is inwardly displaceable into the outlet port in response to the biasing force biasing the sleeve toward the clamping position, such that the clamping member engages the valve, and wherein in response to a first force applied against the contact portion in the direction of the outlet port and a second force applied against the sleeve in a direction opposite the biasing force to overcome the biasing force and move the sleeve toward the release position, the clamping member is separable from the valve.

2. The valve connector of claim 1, further comprising pin configured to open the valve when the valve is received in the outlet port.

3. The valve connector of claim 1, wherein the sleeve includes a shoulder that extends radially outward from the sleeve, such that the second force can be applied against the shoulder.

4. The valve connector of claim 3, wherein the biasing member is a compression spring, and wherein the exterior surface includes a circumferential shoulder against which the compression spring is seated.

5. The valve connector of claim 4, wherein the sleeve includes a radially inward-extending circumferential flange against which the spring applies the biasing force.

6. The valve connector of claim 5, further comprising a retaining ring arranged in a groove in the exterior surface of the body, wherein the flange is biased against the retaining ring when the sleeve is in the clamping position.

7. The valve connector of claim 1, wherein the clamping member is a leaf spring including a first end attached to the exterior surface of the body, an opposite second end arranged at least partially within the aperture, and an intermediate portion between the first and second ends, and wherein the leaf spring has an internal bias causing the second end to deflect away from the longitudinal axis.

8. The valve connector of claim 7, wherein the clamping mechanism includes an actuating surface on the sleeve, and wherein the actuating surface engages the intermediate portion of the leaf spring, causing the second end to be moved into the outlet port for engaging the valve, when the valve is received in the outlet port and the sleeve is in the clamping position.

9. The valve connector of claim 8, wherein the leaf spring deflects away from the longitudinal axis and the second end moves out of the outlet port when the sleeve is in the release position.

10. A valve connector comprising:
a body including
an outlet port in which a valve is at least partially receivable to receive compressed gas discharged from the outlet port, the outlet port defining a longitudinal axis,
at least one aperture extending between an exterior surface of the body and the outlet port, and
a contact portion that is defined on the exterior surface of the body opposite the outlet port;
a sleeve arranged about the exterior surface of the body, the sleeve movable relative to the body between a clamping position and a release position;
a biasing member applying a biasing force against the sleeve towards the clamping position; and
a clamping mechanism including at least one clamping member arranged at least partially within the aperture,
wherein in response to the biasing force biasing the sleeve toward the clamping position, the clamping member is moved into the outlet port, and
wherein in response to a first force applied against the contact portion and a second force applied against the sleeve in a direction opposite the biasing force, the sleeve is moved towards the release position and the clamping member moves out of the outlet port.

11. The valve connector of claim 10, wherein the sleeve includes a shoulder that extends from the sleeve in a direction away from the longitudinal axis, such that the second force can be applied against the shoulder.

12. The valve connector of claim 10, wherein the biasing member is a compression spring, and wherein the exterior surface includes a circumferential shoulder against which the compression spring is seated.

13. The valve connector of claim 12, wherein the sleeve includes a flange against which the spring applies the biasing force.

14. The valve connector of claim 13, further comprising a retaining ring arranged in a groove in the exterior surface of the body, and wherein the flange is biased against the retaining ring when the sleeve is in the clamping position.

15. The valve connector of claim 10, wherein the clamping member is a leaf spring including a first end attached to the exterior surface of the body, an opposite second end arranged at least partially within the aperture, and an intermediate portion between the first and second ends, and wherein the leaf spring has an internal bias causing the second end to deflect away from the longitudinal axis.

16. The valve connector of claim 15, wherein the clamping mechanism includes an actuating surface on the sleeve, and wherein the actuating surface engages the intermediate portion of the leaf spring, causing the second end to be moved into the outlet port for engaging the valve, when the valve is received in the outlet port and the sleeve is in the clamping position.

17. The valve connector of claim 16, wherein the leaf spring deflects away from the longitudinal axis and the second end moves out of the outlet port when the sleeve is in the release position.

18. A valve connector comprising:
a body including
an outlet port in which a valve is at least partially receivable to receive compressed gas discharged from the outlet port, the outlet port defining a longitudinal axis,
a plurality of apertures extending between an exterior surface of the body and the outlet port, and
a contact portion that is defined on the exterior surface of the body opposite the outlet port and is intersected by the longitudinal axis;
a sleeve arranged about the exterior surface of the body, the sleeve movable relative to the body between a clamping position and a release position;
a compression spring applying a biasing force against the sleeve towards the clamping position; and
a clamping mechanism including a plurality of leaf springs corresponding to the plurality of apertures, each leaf spring including
a first end attached to the exterior surface,
an opposite second end arranged at least partially within the corresponding aperture, and an intermediate portion between the first and second ends, each of the leaf springs having an internal bias causing the second end to deflect away from the longitudinal axis, wherein in response to the biasing force biasing the sleeve toward the clamping position, the sleeve contacts the intermediate portions of the leaf springs, and the second ends of the leaf springs are moved into the outlet port, and wherein in response to a first force applied against the contact portion in the direction of the outlet port and a second force applied against the sleeve in a direction opposite the biasing force, the sleeve is moved towards the release position and the second ends of the leaf springs move out of the outlet port.

19. The valve connector of claim 18, wherein the clamping mechanism includes an actuating surface on the sleeve, and wherein the actuating surface engages the intermediate portion of the leaf spring, causing the second end to be moved into the outlet port for engaging the valve, when the valve is received in the outlet port and the sleeve is in the clamping position.

20. The valve connector of claim 19, wherein the leaf spring deflects away from the longitudinal axis and the second end moves out of the outlet port when the sleeve is in the release position.

* * * * *